United States Patent Office

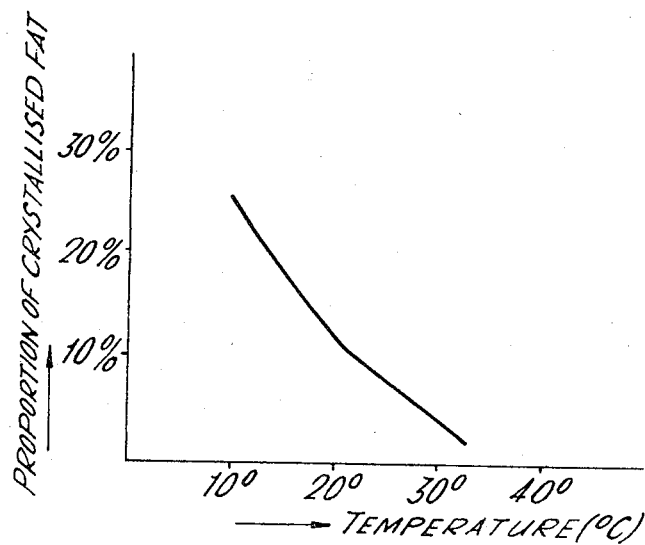
Fig. 2. SOLID-LIQUID DISTRIBUTION CURVE ACCORDING TO EXAMPLE
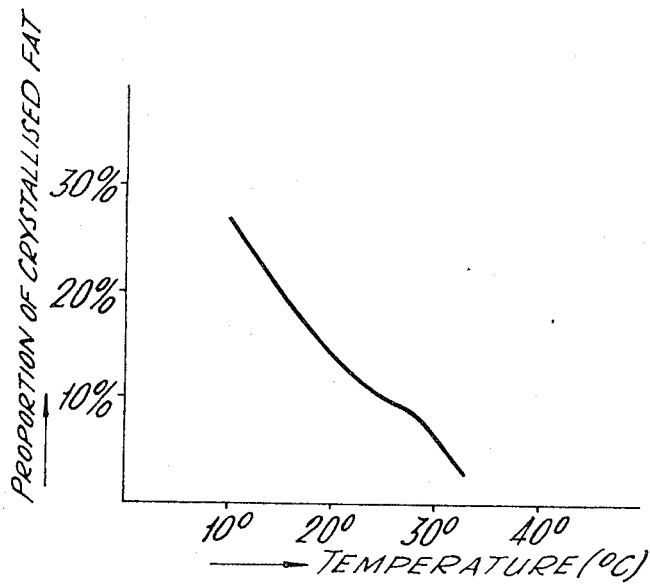
Fig. 3. SOLID-LIQUID DISTRIBUTION CURVE ACCORDING TO EXAMPLE

3,488,199
Patented Jan. 6, 1970

3,488,199
PROCESS FOR PREPARING MARGARINE, ETC.
Karl Friedrich Gander, Hamburg-Altona, and Ewald Georg Becker, Hamburg-Bahrenfeld, Germany, assignors to Lever Brothers Company, New York, N.Y., a corporation of Maine
Filed May 11, 1966, Ser. No. 549,412
Claims priority, application Germany, May 19, 1965, U 11,729
Int. Cl. A23d 3/02
U.S. Cl. 99—122    3 Claims

ABSTRACT OF THE DISCLOSURE

Margarine is prepared by forming an emulsion of a portion of the aqueous phase and a portion of the fat required, subjecting the balance of the fat to precrystallization, mechanical working and cooling, and thereafter combining the cooled precrystallized fat with the emulsion with gentle working.

---

The invention relates to a method of preparing margarine with good melting behaviour in the mouth. The invention provides a method of preparing a margarine which in respect of consistency and melting behaviour in the mouth is superior to margarine prepared in the customary way and resembles butter.

The term "fat" is used herein to include normally liquid fats, commonly termed "oils" as well as normally solid fats.

According to the present invention, in making margarine part of the fat is emulsified with the liquid phase and the remainder is subjected to precrystallisation by cooling while being mechanically worked, the heat generated is removed from the precrystallised fat by cooling to at least 20° C. and the cooled fat is then mixed with the emulsion with gentle working and the resulting margarine is then packed.

Preferably the initial emulsion is of the oil-in-water (O/W) type and until mixed with the cooled fat the temperature of the emulsion is kept sufficiently high to avoid substantial phase inversion. When mixed with the cooled fat however inversion occurs so that in the margarine produced most of the fat provides the continuous phase through which is distributed aqueous droplets at least a proportion of which contain enclosed fat (the so called "butter globules") which are not present in normally prepared margarine and which have an important favourable effect on organoleptic properties.

The various known types of emulsion may be used as the emulsion in the method according to the invention.

The precrystallisation is preferably so effected as to cause 5 to 20%, and especially 10 to 15% of the non-emulsified fat to crystallise before admixture with the emulsion.

By the process of the invention margarine with very good melting behaviour in the mouth can be prepared. The sensation of very rapid, pleasant melting of the margarine in the mouth is particularly marked when the initial emulsion used is mainly of the O/W (i.e. oil-in-water) type.

The fat used should always be cooled to below 20° C. and pre-crystallised as much as possible before it is mixed with emulsion. Cooling is usually done in a scraped surface tubular heat exchanger such as a "Votator" (registered trademark) A-unit. In some cases it may be preferable to do the cooling slowly, especially as slow cooling produces bigger crystals, which are desirable since they improve the melting behaviour of the margarine.

To carry out the method according to the invention an emulsion can, for example, first be prepared in the known way from water and/or skimmed milk and vegetable and/or animal oils and/or fats in the homogenisers normally used in the preparation of emulsions or in suitable pumps, such as gear pumps. When, in accordance with the preferred form of the invention, an emulsion which is chiefly of the O/W type is used it is best to use soured milk as the aqueous phase in its preparation—as is usual in the production of margarine—and to adjust the pH value of the emulsion obtained to about 4.4–6.5. With pH values of, for example, 5 or higher it is advisable to add preservatives, such as sorbic acid.

The fat content of the emulsion can be varied within wide limits, for instance between 40 and 75% (preferably 50 to 65%) by weight.

In the preparation of the emulsion the natural ingredients of the milk, for example milk protein, or natural proteins of a different origin, e.g. chicken protein, soybean protein, egg yolk or the like, or emulsifiers such as lecithin, serve as emulsifiers and stabilisers, and phosphates and polyphosphates may also be present in small quantities. When, in accordance with the invention, an O/W emulsion is used the protein content should amount to 5–20% of the aqueous phase of the emulsion. When a W/O emulsion is used, emulsifiers usual for this type of emulsion, as for example monoglycerides, lecithin, egg yolk, may be employed in concentrations of 0.1–2% of the aqueous phase of the emulsion.

In any case when making margarine it must be ensured that, when the emulsion is mixed with the appropriate amount of fat which has been pre-treated in the way described below, a product is obtained which satisfies the legal requirements in force as to the composition of margarine, for instance as to the maximum proportion of water that may be present. In most countries this proportion may not exceed 16% but in some countries as high a proportion as 20% is permissible.

The most diverse suitable oils or fats may be used, depending on the type of margarine desired. Examples of suitable oils and/or fats both for the continuous fat phase and for the fat portion of the emulsion are: groundnut oil, cottonseed oil, sunflower seed oil, palm oil, coconut oil and palm kernel oil. These may be hardened or non-hardened and may be mixed in suitable proportions.

According to the invention the fat to be mixed with the emulsion (fat phase) may be subjected to the following treatment before mixing:

In a Votator system customary in the margarine industry the fat portion to be precrystallised is cooled to temperatures of less than 20° C. in one or more cooled cylinders equipped with rotor and scraping devices in the usual way. The cooled fat then passes from the cooled cylinder or cylinders into one or more crystallisers equipped with rotors, where, with the rotor operating at a high speed—approx. 400 to 800 r.p.m., preferably 500 to 700 r.p.m.—it is mechanically worked intensively. The cooled, precrystallised fat goes from the crystalliser or crystallisers to one or more further cooled cylinders in which the heat of crystallisation and the heat generated by the mechancal activity is removed. The cooled and intensively pre-crystallised fat then passes from the cooling cylinder or cylinders through an appropriate pipe system and is introduced into a mixing device, for example a mixing nozzle, together with the emulsion prepared in the way described above. During mixing the temperature of the fat is about 5–20° C., preferably 7–18° C., and that of the emulsion less than 25° C., preferably 17–23° C. The mixture obtained is then thoroughly mixed in a mixing vessel and gently worked. The stirrer in this mixing vessel is set at a relatively low speed so that there is only a small amount of frictional heat and a correspondingly small rise in temperature during this process. The finished product obtained is then preferably packed liquid into tube.

In the accompanying drawings:

FIGURE 2 is a graph of solids content index plotted against temperature in respect of the fat mixture used in Example 1 below; and FIGURE 3 is a graph similar to that of FIGURE 2 but in respect of the fat mixture used in Example 2.

Figure 1:
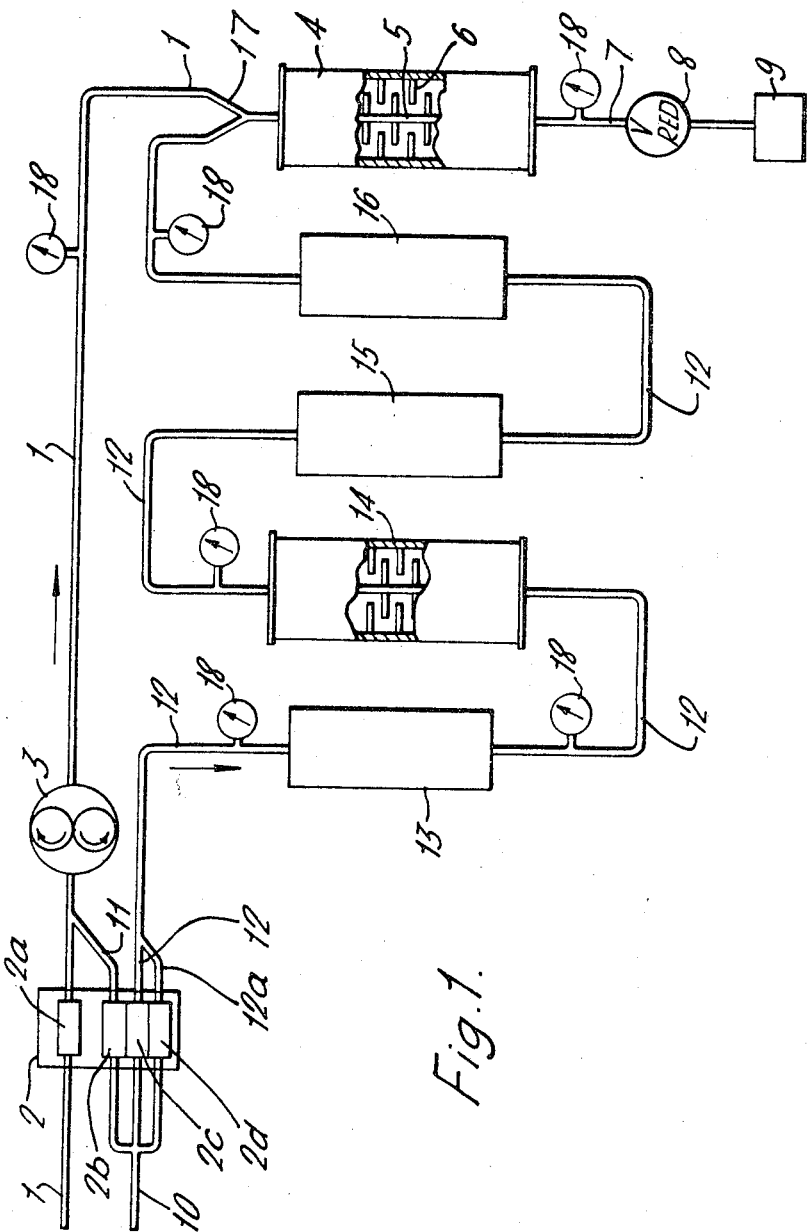
FIGURE 1 is a lay-out diagram of apparatus for carrying out the process of the invention, all the components being conventional items of equipment used in the "Votator" method of margarine production.

Referring to FIGURE 1, a pipe 1 is arranged to supply the aqueous phase for the margarine from one cylinder 2a of a proportionating pump 2, whence it passes to an emulsifying pump 3 and then into a mixing vessel 4 having a stirrer 5 provided with driving means (not shown) and baffles 6. An outlet pipe 7 from the mixing vessel leads through a reducing valve 8 to a filling device 9 for the margarine.

A pipe 10 is arranged to supply fat to the remaining three cylinders 2b, 2c and 2d of the proportionating pump 2, in which cylinder 2b is arranged to feed a predetermined proportion of the total fat along branch pipe 11 and pipe 1 to the emulsifying pump 3, while cylinders 2c and 2d feed the remainder of the fat respectively through pipes 12 and 12a to a scraped surface tubular heat exchanger 13 whence it is fed in turn through a crystalliser 14 similar in construction to the mixing vessel 4, through two further scraped surface tubular heat exchangers 15 and 16 and then into pipe 1 at a point 17 between the emulsifying pump 3 and the mixing vessel 4.

Temperature measuring devices 18 are provided where indicated on the drawing.

In operation, a proportion of the fat, predetermined by proportionating pump 2 together with the aqueous phase, is emulsified in the emulsifying pump 3 and the resulting stream of emulsion is fed at point 17 into a stream of precrystallised cooled fat of volume predetermined by proportionating pump 2 this having been cooled in the heat exchanger 13 to initiate precrystallisation subjected to crystallisation with vigorous mechanical working in the crystalliser 13 and cooled again in the heat exchanger 15 and 16 to remove the heat generated in the crystalliser. The combined stream is then passed through the mixing vessel 4, where intimate admixture is effected with little energy input and the resulting composition is homogenised by passage through the reducing valve 8 and filled into containers by the filling device 9. The arrows show the direction of flow.

Examples 1 and 2 below illustrate the process of the invention.

EXAMPLE 1

A margarine was made from a fat composition containing a conventional vitamin concentrate and having the following characteristics:

Slipping point, ° C. _____ 29 to 30
Dilatation at 20° C. _____ 315 to 345
Dilatation at 30° C. _____ 85 to 100
Dilatation at 36° C. _____ 20 to 35

The slipping point was determined by the method described for margarine fats in Bailey, "Melting and Solidification of Fats" 1950 page 110. The dilatations were determined by the method described in British Patent No. 827,172. The Solids Content Index (S.C.I.) was determined by the dilatation method described in Journal of the American Oil Chemists' Society, 31, 98 to 103 (1956) for temperatures ranging from 10 to 36° C. and from the results the curve shown in FIGURE 2 of the accompanying drawings was constructed.

The apparatus used was that shown in FIGURE 1 of the drawings. The fat stream was divided by the proportionating pump 2 into two streams of which that fed to the heat exchanger 13 (fat stream I) amounted to 60% of the total fat the remainder (fat stream II) being fed to the emulsifying pump 3.

Fat stream I, supplied at the rate of 576 kg. per hour, was cooled in the heat exchanger 13 from 36 to 13.5° C. At this temperature, at which it was starting to crystallise, the fat passed to the crystalliser 14, where, with the stirrer operating at a speed of 500 r.p.m., it was worked and intensively precrystallised, during which time the temperature rose by 7° C. to 20.5° C. The average residence time in the crystalliser was 6 minutes. A sample taken from the fat as it left the crystalliser 14 did not exhibit any further measurable rise in temperature as a result of heat of crystallisation being liberated. The fat crystals were visible in polarised light under the optical microscope. It can therefore be assumed that at this temperature crystallisation/melting equilibrium had almost been reached. On this assumption, from the solid/liquid distribution curve shown in FIGURE 2 the proportion of crystallised material in the stream at this point was estimated to be approximately 11%.

The fat then passed successively into the heat exchangers 15 and 16, where its temperature was brought down again to 7° C. by further cooling.

Fat stream II was emulsified at 36° C. in the emulsifying pump 3 with the aqueous phase (soured skimmed milk of pH 4.4) at 10° C. to form an O/W emulsion with a temperature of 22° C.

The soured skimmed milk was dosed by a piston in the piston proportionating pump 2 in such a quantity that with fat stream II it formed an O/W emulsion containing 61.5% fat. The emulsion was passed at a rate of 624 kg. per hour out of the emulsifying pump to join the precrystallised and cooled fat stream I and this mixture was then thoroughly mixed and gently worked in the mixing vessel 4 at a rate of 1200 kg. per hour. During the working process with the stirrer driven at 55 r.p.m., the average residence time in this vessel was 3 minutes.

The emulsion thus obtained flowed out of the mixing vessel 4 at a temperature of 20° C. through the reducing valve 8 with an aperture diameter of 3 mm. to the packaging machine where the margarine emulsion was packed into tubs in a semi-liquid condition at a temperature of 20.5% C. The pressure directly in front of the 3 mm. nozzle was 20 atmospheres.

Distinctive qualities of the finished margarine were good spreadibility both at room temperature and at refrigerator temperature and, in particular, an unusually good melting behavior in the mouth which is very reminiscent of butter, i.e. it melted very quickly and left a cool, creamy sensation in the mouth. It also exhibited good flavour and consistency retention. At the same time the aroma and other flavouring substances—surprisingly those contained in the aqueous phase—came into effect particularly quickly and intensively. The melting behaviour of this margarine was thus characteristically different from that of ordinary margarine and proved to be particularly advantageous and desirable.

Microscopic tests showed that the cream structure in the margarine was partially retained, i.e. the margarine contained drops of oil surrounded by a film of water (so-called "butter globules") scattered through the continuous fat phase.

EXAMPLE 2

Margarine was made from a fat composition consisting of:

|  | Percent |
|---|---|
| Cottonseed oil | 35 |
| Coconut oil | 15 |
| Hardened cottonseed oil—slipping point 33–35° C. | 10 |
| Hardened fish oil—slipping point 36–38° C. | 20 |
| Hardened soyabean oil—slipping point 40–42° C. | 20 | and including the conventional vitamin content.

By the method described in Example 1 the curve shown in FIGURE 3 was constructed.

The apparatus was the same as for Example 1 except that the emulsifying pump 3 was omitted. The fat stream was divided by the proportionating pump 2 into two streams (stream I and II) of which stream I amounted to 60% and stream II 40% of the total.

Stream I was supplied at a rate of 576 kg. per hour via the pipe to the heat exchanger 13 where it was cooled from 36° C. to 11° C. At this temperature, at which it was already crystallising the fat passed to the crystalliser 14, where, with the stirrer operating at a speed of 500 r.p.m., it was worked and intensively precrystallised, during which time the temperature rose by 7.5° C. to 18.5° C. A sample taken from the fat as it left the crystalliser did not exhibit any further measurable rise in temperature as a result of heat of crystallization being liberated. From the solid/liquid distribution curve, shown in FIG. 3, a proportion of crystallised fat amounting to 16% was estimated at this point.

Without using any special emulsifying devices, fat stream II was mixed at 36° C. with soured skimmed milk of pH 4.4 at 10° C. to form an O/W emulsion with a temperature of 23° C. The milk was dosed by a piston in the proportionating pump 2 in such a quantity that with fat stream II it formed an emulsion containing 61.5% fat. The emulsion was passed at a rate of 624 kg. per hour from the proportionating pump to join the precrystallised and cooled fat stream and the mixture was then throughly mixed and gently worked in the mixing vessel at a rate of 1200 kg. per hour. With the stirrer driven at 55 r.p.m., the average residence time was 3 minutes. The process was completed as described in Example 1.

The following example illustrates a method differing from that of the invention in that the non-emulsified fat was not subjected to precrystallisation before mixing with the emulsion.

EXAMPLE 3

A margarine was prepared from the same fatty composition as in Example 2. Here again an O/W emulsion containing 61.5% fat and pure fat in the proportions indicated in Example 2 were separately cooled, mixed and the mixture cooled further. Unlike Example 2, however, the emulsion was in this case cooled to a temperature of 13.5° C. The fat, on the other hand, was cooled to a point at which it could still flow, i.e. at which it was not yet crystallising (19° C). Without precrystallisation of the fat the two components were then united in a pipe directly before entering a further cooling cylinder and the mixture was cooled to a temperature of 13° C. After cooling, the emulsion passed at a temperature of 13–14° C. and at a rate of 1200 kg. per hour through a pipe system via a homogenising nozzle with an aperture diameter of 3 mm. to the packaging machine, where it was packed into tubs in a semi-liquid condition at a temperature of 13–14° C. The pressure directly in front of the 3 mm. nozzle was 20 atm.

The temperature in the tub rose by about 3° C. to 16.5 C. as a result of heat of crystallisation being liberated.

The properties of the margarine products prepared according to Examples 2 and 3 are shown in the following table:

| Physical data | Example 2 | Example 3 |
|---|---|---|
| Consistency values (flow point, g. per sq. cm.): | | |
| At 8° C. | 1,350 | 2,350 |
| At 15° C. | 740 | 1,180 |
| At 20° C. | 420 | 270 |

The flow points were determined with the conical penetrometer normally used for this purpose. The method is described in Journal of the American Oil Chemists' Society, 36 (1959), pages 345–348. The significance of the flow point values is as follows:

| | |
|---|---|
| No longer spreadable | 1500 |
| Limited spreadability | 800 |
| Readily spreadable | 100–800 |

(cf. Fette, Seifen, Anstrichmittel, 65 (1963), page 481).

As the table shows, the margarine according to the invention (Example 2) is spreadable within a wider range than the margarine prepared without precrystallisation of the non-emulsified fat (Example 3).

According to the invention margarine products which likewise have the advantageous properties described can be obtained in a similar way to that described in the examples using the most diverse fatty compositions and with different fat/emulsion ratios. The ratio of non-emulsified to emulsified fat may, for example, range from 30:70 to 70:30 but is preferably between 35:65 and 65:35.

What is claimed is:
1. A method of preparing margarine having a fat phase and an aqueous phase comprising the steps of rapidly chilling a portion of the fat to a temperature within the range of 5–20° C., working the chilled fat for a time sufficient to crystallize from 5–20% of the chilled fat while removing a substantial part of the heat generated by the crystallization to maintain a temperature of 5–20° C., emulsifying the aqueous phase with the balance of the fat in liquefied form to form an oil-in-water emulsion containing 40–75% fat, the emulsifying step being conducted at a temperature that provides a final emulsion temperature below 25° C., promptly thereafter mixing emulsion with the chilled non-emulsified fat and thereafter packing the mixture.

2. Method according to claim 1, wherein the non-emulsified fat is chilled to a temperature between 5 and 20° C. in each of a succession of scraped surface heat exchangers between which is interposed a crystallizing zone in which the fat is present for a substantially longer residence time to liberate sufficient heat of crystallization for the temperature of the fat to rise about 7° C., thereby achieving substantial equilibrium between the liquid and solid phases of the fat.

3. A method according to claim 2, wherein the average residence time in the intermediate crystallization zone is about 6 minutes.

References Cited

FOREIGN PATENTS 765,870 1/1957 Great Britain.
826,554 1/1960 Great Britain.

MAURICE W. GREENSTEIN, Primary Examiner